United States Patent [19]

Zucker et al.

[11] 4,344,858
[45] Aug. 17, 1982

[54] ANTI-FOAMING COMPOSITIONS

[75] Inventors: Newton Zucker, Pepper Pike; William M. Ellslager, South Euclid, both of Ohio

[73] Assignee: Kalcor Coatings Company, Inc., Willoughby, Ohio

[21] Appl. No.: 780,667

[22] Filed: Mar. 23, 1977

[51] Int. Cl.³ ............................................. B01D 19/04
[52] U.S. Cl. ..................................... 252/358; 252/321
[58] Field of Search ................................ 252/358, 321

[56] References Cited

U.S. PATENT DOCUMENTS

| | | | |
|---|---|---|---|
| 2,551,197 | 5/1951 | Barr, Jr. ........................... | 252/321 X |
| 2,773,041 | 12/1956 | Larsen et al. ........................ | 252/358 |
| 2,966,506 | 12/1960 | Jordan ............................... | 260/448 C |
| 3,076,768 | 2/1963 | Boylan .............................. | 252/358 |
| 3,383,327 | 5/1968 | Sullivan ............................ | 252/358 |
| 3,423,340 | 1/1969 | Marshall et al. ................. | 252/358 X |
| 3,567,574 | 3/1971 | Braitberg et al. ..................... | 162/70 |
| 3,697,442 | 10/1972 | Lieberman ....................... | 252/358 X |

*Primary Examiner*—Richard D. Lovering
*Attorney, Agent, or Firm*—Milton Zucker

[57] ABSTRACT

The settling problem in anti-foaming compositions for aqueous systems such as latex paint, which are based on dispersions of finely divided hydrophobic silica in nonaqueous media such as hydrocarbon liquids, is overcome by emulsifying the anti-foamer in water with the help of hydrophilic bentonite or similar colloidal clay. Surprisingly, the anti-foaming effect of the dispersed silica is increased by a factor of about 100%.

4 Claims, No Drawings

4,344,858

ANTI-FOAMING COMPOSITIONS

BACKGROUND OF THE INVENTION

This invention relates to compositions useful in reducing foaming in aqueous film forming compositions such as latex paint and rubber slab dips, particularly those based on dispersions of hydrophobic silica in hydrocarbon or other hydrophobic liquids, and aims to simultaneously overcome the settling properties in such anti-foam and enhance their anti-foam activity.

THE PRIOR ART

In the preparation of aqueous film forming compositions such as latex paints and rubber slab dips, it is essential that foaming of the composition be minimized, since foam interferes with the continuity of the films laid down by the composition. The problem has been dealt with in a host of ways. One technique—broadly disclosed in U.S. Pat. No. 2,773,041—involves using as anti-foamer a finely divided powder dispersed in a hydrophobic liquid such as mineral oil or other hydrocarbon. A particularly effective defoaming agent is disclosed in Boylan U.S. Pat. No. 3,076,768 issued Feb. 5, 1963; it consists of a finely divided hydrophobic silica dispersed in a hydrophobic liquid, with an agent which permits dispersal of the defoamer in an aqueous system.

A problem arises with such defoamers in use. They tend to stratify, with the silica separating from the liquid; it is necessary to continually stir the material if only a portion of a container is to be used. Since anti-foamers are generally very minor constituents in any aqueous film former, full containers of anti-foamers are rarely used, making the stratification highly undesirable for the user.

It has been proposed (Sullivan U.S. Pat. No. 3,383,327, issued May 14, 1968) to overcome this settling by the use of a siloxane fluid. Unfortunately, this proposed solution is rather expensive, and in some coating compositions causes difficulties because of the presence of the siloxane.

It has also been proposed (Braitbert et al. U.S. Pat. No. 3,567,574, issued Mar. 3, 1971) to incorporate, into anti-foaming agents, both hydrophobic silica and bentoite clay, surface treated to render it hydrophobic. This appears to be an attempt to reduce the cost of these anti-foaming compositions by substituting the cheaper bentonite for the expensive finely divided silica.

STATEMENT OF THE INVENTION

We have found an inexpensive means for overcoming the settling tendencies of anti-foamers comprising dispersions of hydrophobic finely divided silica in hydrophobic liquids with a surfactant permitting dispersal in aqueous systems, which quite unexpectedly increases the anti-foaming effect of the silica dispersions by about 100%. In accordance with this invention, we prepare a dispersion of such an anti-foam composition in water and a hydrophilic colloidal clay such as bentonite, using at least about 10% of bentonite based on silica. The resulting compositions are not only non-settling, but produce anti-foaming effects equal to that of the original settling defoamer with somewhat less than 50% of original defoamer in our finished compositions.

DETAILED DESCRIPTION OF THE INVENTION

As set forth above, this invention is concerned with anti-foaming agents for aqueous film foamers. These film foamers may be of various types. They are often latex paints, i.e., dispersions of solids in an aqueous system having a nonaqueous film former therein, or they may be simple dispersions of solid particles in water plus a surfactant, such as rubber slab dips used to prevent the adhesion of slabs of rubber to each other, the resulting film being essentially dry powder spread into a fairly uniform film. Defoamers are used in both types of compositions not only because foaming makes application difficult, but foam produces film blemishes which pose serious problems.

A standard type of anti-foamer comprises a dispersion of finely divided hydrophobic silica in a hydrophobic liquid containing a surfactant which permits emulsification of the anti-foam composition into the product which it is to protect from foaming. Typically, these compositions contain 5 to 25% of finely divided silica, which may be silica aerogel, flamed silica, or any other silica of very small particle size and high surface area. The surface of the silica is hydrophobic, because of its physical or chemical treatment. The silica is dispersed in a hydrophobic liquid, most generally, from cost considerations, a mineral oil. A surfactant is present to insure that the finished defoamer can be readily dispersed in the composition it is designed to work with. The defoamers are used in very minor amounts, generally no more than a few percent of the composition, to minimize any effect other than anti-foaming.

As pointed out, this type of defoamer settles out in the container, with the silica stratifying to the bottom. Hence, when using, the container must be well stirred, or else the amount of effective defoamer added will not be correct. This is costly in any event, and causes trouble because batchmakers are not always as careful as they should be. Hence, a non-settling defoamer is highly desirable.

In accordance with the invention, an anti-foaming agent is produced by emulsifying any standard silica-hydrophobic liquid-surfactant defoamer in water containing a hydrophilic colloidal clay like bentonite; using at least about 10% of bentonite based on silica. The resultant composition is non-settling. In addition, a standard defoamer, reduced with an equal weight of water plus bentonite, is as effective as the original composition in controlling foam, so that a 100% increase in effectiveness of the expensive silica is obtained at minimal cost.

The amount of bentonite used can be somewhat less than 10%, without losing the improved settling, but the improvement in anti-foam properties increases up to that point, and then flattens out. Moreover, body increases in the emulsion as the amount of bentonite increases. We have found that about optimum handling body (800 to 1000 centipoise viscosity at 75° F. measured on a Brookfield viscometer at 10 RPM with a #2 spindle) is obtained when an original defoamer containing about 20% silica is reduced with an equal or slightly higher weight of water containing 2% bentonite. More bentonite can be used, but body increases. This can be compensated for by further dilution, but this reduces the anti-foam effect. If higher body is desired—e.g., for incorporation into a paste system to be further diluted—obviously more bentoite would be useful.

The bentonite can be replaced by other hydrophilic colloidal clays with similar film forming properties.

A typical example of the invention is the following:

810 parts by weight anti-foam composition (Drew Chemical Co. Y-250) comprising about 20% hydrophobic finely divided silica about 80% of mineral oil containing a surfactant to make it emulsifiable and 834 parts by weight water were emulsified together in a high-speed vortex mixer, adding the water to the defoamer at the rate of about 25 to 40 pounds per minute. Five minutes after all the water was in, there was added:

150 parts by weight of a gel prepared by dispersing 16 parts of Wyoming bentonite (−400 mesh)

in 134 parts of water, dispersing the bentonite in the water in a colloid mill for 5 minutes, then aging 10 minutes before adding to the batch. The resultant emulsion was mixed till uniform, and filled into containers.

The product flowed freely, having a viscosity of 800 to 1000 centipoise at 75° F. on a Brookfield viscometer using a #2 spindle at 10 RPM. It showed no separation on standing and withstood five freeze-thaw cycles without breaking. Moreover, it could be used, pound for pound, in latex paint and rubber slab dip compositions, with approximately the same anti-foaming effect as the undiluted defoamer containing 20% of silica.

Obviously, the specific components used in the example can be varied as taught in the specification, and the proportions varied as indicated without departing from the scope of the invention as defined in the claims.

We claim:

1. An aqueous flowable composition for controlling foam in aqueous film-forming compositions consisting essentially of a nonaqueous phase consisting essentially of 5 to 25% by weight of the nonaqueous phase of a finely divided hydrophobic silica, and a hydrophobic liquid carrier therefor having dispersed therein a surfactant to permit the nonaqueous phase to be emulsified in an aqueous phase, said nonaqueous phase being emulsified in an aqueous phase consisting essentially of water with hydrophilic bentonite dispersed therein, in an amount at least about 10% of the weight of the silica, to a maximum amount such that the total composition is still flowable, the composition being characterized by being resistant to settling, and by an anti-foaming effect substantially greater than that of a similar composition without the bentonite.

2. The composition of claim 1, in which the hydrophobic liquid is a mineral oil.

3. The composition of claim 1, which contains about 10% silica and about 1% bentonite.

4. The composition of claim 3, in which the hydrophobic liquid is a mineral oil, and the aqueous phase comprises a bit more than half the total composition.

* * * * *